United States Patent [19]

Andreatta et al.

[11] Patent Number: 5,751,389
[45] Date of Patent: May 12, 1998

[54] FILM CONTAINING ORIENTED DYE, METHOD OF MANUFACTURING THE SAME, AND POLARIZER AND LIQUID CRYSTAL DISPLAY UNIT UTILIZING THE SAME

[75] Inventors: Alejandro Andreatta, Santa Barbara, Calif.; Shuji Doi, Ibaraki, Japan

[73] Assignee: Sumitomo Chemical Company, Osaka, Japan

[21] Appl. No.: 387,589

[22] Filed: Feb. 13, 1995

Related U.S. Application Data

[63] Continuation-in-part of Ser. No. 303,351, Sep. 8, 1994, abandoned.

[51] Int. Cl.$^6$ .................... G02F 1/1335; G02B 5/30; G02B 27/28
[52] U.S. Cl. .................... 349/97; 359/491
[58] Field of Search .................... 359/63, 98, 490, 359/491, 492, 489; 252/585; 428/910; 349/97, 165

[56] References Cited

U.S. PATENT DOCUMENTS

| | | | |
|---|---|---|---|
| 3,205,775 | 9/1965 | Marks | 359/492 |
| 3,650,625 | 3/1972 | Hoyte, Jr. | 359/490 |
| 4,193,287 | 3/1980 | Pfeiffer | 359/63 |
| 4,684,434 | 8/1987 | Thakur et al. | |
| 4,698,121 | 10/1987 | Thakur et al. | |
| 4,838,658 | 6/1989 | Zondler | 359/75 |
| 5,004,324 | 4/1991 | Leenhouts et al. | 359/63 |
| 5,024,850 | 6/1991 | Broer et al. | 428/910 |
| 5,176,786 | 1/1993 | Debe | |
| 5,180,470 | 1/1993 | Smith et al. | 117/58 |
| 5,235,449 | 8/1993 | Imazeki et al. | 359/492 |
| 5,284,779 | 2/1994 | Miyanaga | |
| 5,327,285 | 7/1994 | Faris | 359/483 |
| 5,340,504 | 8/1994 | Claussen | 252/585 |

FOREIGN PATENT DOCUMENTS

| | | |
|---|---|---|
| 0 562 587 | 9/1993 | European Pat. Off. |
| 2-160697 | 6/1990 | Japan |

OTHER PUBLICATIONS

Faris, "Micro–Polarizer Arrays Applied to a New Class of Stereoscopic Imaging", SID 91 Digest, 1991, pp. 840–843.

Nature, vol. 352, 1 Aug. 1991, London, GB pp. 414–417, Wittmann et al. 'highly oriented thin films . . . '.

J. Polymer Science: Part B: Polymer Physics, vol. 30, 1992, USA, pp. 1173–1176, Krueger et al 'elastic properties of thin ultraoriented . . . '.

Synthetic Metals, vol. 55, No. 1, 15 Mar. 1993, Elsevier Sequoia, pp. 454–459, K. Pichler and R.H. Friend, 'Chain Alignment in Poly . . . '.

*Primary Examiner*—William L. Sikes
*Assistant Examiner*—Walter Malinowski
*Attorney, Agent, or Firm*—Burns, Doane, Swecker & Mathis LLP

[57] ABSTRACT

Films containing oriented dye, methods of manufacturing such films, and polarizers and liquid crystal display devices utilizing the films are disclosed. The film contains at least one dichroic dye which is uniaxially oriented. A film has a thickness of not less than 1 nanometer and not greater than 5 micrometer and contains the dichroic dye of not less than 1 percent by weight and not greater than 100 percent by weight. The film has a peak of absorption at 400 nm through 800 nm and a dichroic ratio of not less than 25 at the peak of absorption. The film may include a micro-pattern having a minimum width in a film plane of not less than 1 micrometer and not greater than 200 micrometer. In such a case, the dichroic dye has a dichroic ratio of not less than 10 at the peak of absorption. A method of manufacturing such a film according to the invention includes the step of forming a dye-containing film on a substrate having a fluororesin alignment layer on the surface thereof. The dye-containing film includes at least one dichroic dye or a mixture of at least one dichroic dye and at least one polymer compound. In subsequent steps, the dye-containing film may be stripped off from the substrate and transferred to another substrate.

30 Claims, 4 Drawing Sheets

FILM CONTAINING ORIENTED DYE, METHOD OF MANUFACTURING THE SAME, AND POLARIZER AND LIQUID CRYSTAL DISPLAY UNIT UTILIZING THE SAME

This is a continuation-in-part of Ser. No. 08/303,351, filed on Sep. 8, 1994 now abandoned.

BACKGROUND OF THE INVENTION

1. Field of the Invention

The present invention relates to films based upon or containing oriented dye. It also relates to methods of manufacturing such films and to polarizers and liquid crystal display devices utilizing the films. More specifically, the invention pertains to films made of or containing highly oriented dichroic dye, methods of manufacturing such films, and high-performance polarizers and liquid crystal display devices utilizing the films.

2. Description of Related Art

Polarizers are used as elements of liquid crystal displays (hereinafter referred to as LCDs). Polarizers have the property of absorbing some of the light transmitted from the LCDs. This becomes a particularly acute problem with full color LCD's since full color LCD's contain color filters as well. The polarizer present in the LCD and the color filter used in the full-color LCDs both absorb light. This reduces the quantity of transmitted light to a level that is often quite low. A powerful backlight is thereby required for sufficiently bright LCDs. This backlight can undesirably raise the temperature of the liquid crystal cell and increase the power consumed. One type of polarizer is manufactured by adsorbing iodine onto a uniaxially stretched, oriented alignment film of polyvinyl alcohol (hereinafter referred to as PVA) or a derivative of PVA.

A second type of polarizer is based on dichroic dyes and is similarly produced by adsorbing the dye onto a uniaxially stretched oriented PVA or PVA derivative alignment film. (Throughout this specification and claims, the terms "dichroic" and "dichroic dye" have their commonly accepted meanings and refer to the property of presenting different optical properties e.g., color—when viewed from different directions, and thus to in effect give a polarized response.)

A third type of polarizer is produced by uniaxially stretching a polyvinyl chloride or PVA film and then generating polyene units as chromophores by dehydrohalogenation of the polyvinyl chloride or by dehydration of the PVA.

The iodine-containing polarizers initially exhibit excellent polarizing power. These polarizers, however, have poor resistance to water and heat and are not sufficiently durable under conditions of high temperature and high humidity. Protective films or other possible measures typically do not significantly improve the durability of the iodine-containing polarizers.

The dichroic dye polarizers have greater resistance to water and heat than the iodine-based materials, but have inadequate polarizing properties for most commercial applications. Pigments, which have excellent weather resistance, cannot be substituted since they are not highly oriented in polymer films and thus cannot be used for polarizers.

In addition, many difficulties arise when trying to manufacture fine polarizers such as polarizers having a width of not greater than about 200 micrometers. Cutting a dyed alignment film is the only way presently used to prepare such fine polarizers.

Thus, the known methods of orienting dye molecules include the use of an oriented PVA film which aligns the dye molecules as has been described above. It is also known that one can mix a dye with a liquid crystal material and orient the dye as the liquid crystal molecules in the liquid crystal cell are themselves aligned. In the latter method, a liquid crystal material must be sealed between two glass plates or placed within a cell. This method further requires that an alignment film be formed on the surface of the glass plates. The degree of alignment of the dye depends upon the degree of the alignment of the liquid crystal material, so that in many cases the polarizer does not have a sufficient polarizing power due to low alignment of the liquid crystal material.

Films containing highly oriented dichroic dyes and particularly films which include micropatterned, highly oriented dichroic dyes and their easy manufacture are thus in high demand.

Although not relating to orienting dye molecules, J. C. Wittmann et al. have found that an oriented polytetrafluoroethylene (hereinafter referred to as PTFE) thin film may be formed by rubbing PTFE while applying heat and pressure. They have reported that alkanes, liquid crystal molecules, polymers, oligomers, and inorganic salts can be oriented using this oriented PTFE film as an alignment layer (See Nature, Vol. 352, p. 414 (1991) and U.S. Pat. No. 5,180,470). While alignment of these organic molecules with this oriented PTFE thin film has been reported in detail, alignment of dye molecules useful for polarizers, or more specifically, alignment of dichroic dye molecules for polarizers, has not been elucidated.

SUMMARY OF THE INVENTION

It has now been found that through the use of fluororesin orientation films such as PTFE orientation films, one can achieve highly oriented dichroic dyes. The present invention concerns these oriented dye-containing films, methods of manufacturing these films; and high performance polarizers and liquid crystal display devices which utilize these films.

Thus, in one aspect, this invention provides a uniaxially oriented film which includes one or more dichroic dyes. This film contains at least 1% by weight dichroic dye up through being completely dichroic dye (100% by weight dye). The remainder is a binder polymer or diluent or the like. The film has a thickness of from 1 nanometer to 5 micrometers, a wavelength of peak absorbance of from 400 to 800 nanometers, and a dichroic absorbance ratio of not less than 25 at the wavelength of peak absorbance.

In another aspect, this invention provides a body of micro-patterned dye-containing, film. This film comprises at least 1% by weight up to 100% by weight of uniaxially oriented dichroic dye. This body of film has a thickness of from 1 nanometer to 5 micrometers and a wavelength of peak absorbance of from 400 to 800 nanometers, and a dichroic absorbance ratio of not less than 10 at the wavelength of peak absorbance. This body has a length and width in the film plane with the width being in the range of from about 1 to about 200 micrometers.

In another aspect, this invention provides a method for manufacturing the uniaxially oriented film just described. This method involves forming a film from a film-forming material which includes at least 1% by weight dichroic dye and has a thickness of from 1 nanometer to 5 micrometers and a wavelength of peak absorbance of from 400 to 800 nanometers. This film-forming takes place on a substrate having a fluororesin alignment layer as its surface. This produces a uniaxially oriented film having a dichroic absorbance ratio of not less than 25 at the wavelength of peak absorbance. The film-forming material may in some cases be neat dichroic dye but alternatively may include a film-forming binder polymer mixed with dichroic dye. In more specific aspects, this method may include additional steps of stripping the film from the forming substrate and applying the film to a supporting substrate different from the forming substrate.

In yet an additional aspect, this method may be used to manufacture bodies of micropatterned dye-containing film. In this embodiment, the alignment substrate should have a defined width in the film plain of from about 1 to about 200 micrometers with the fluororesin alignment layer being present on the surface in that defined-width region. This will yield bodies of uniaxially oriented film having a defined width of from about 1 to about 200 micrometers and a dichroic absorbance ratio of not less than 10 at the wavelength of peak absorbance. As with the more general method, this method may include the additional steps of stripping the film from the forming substrate and applying the film to a supporting substrate.

In another aspect, this invention provides polarizers. A polarizer results when a transparent support having a planar surface has a uniaxially oriented film as described above attached to its planar surface. Typical transparent supports for such polarizers can be polymer films, glass supports or transparent electrodes.

In an additional aspect, the invention can provide micropolarizers having the same general structure. These micropolarizers include the same type of transparent support carrying a body of the micropatterned dye-containing uniaxially oriented film upon its planar surface.

In additional aspects, this invention provides liquid crystal display devices. These devices include a liquid crystal cell containing a pair of separated transparent substrates having electrodes thereon and a nematic liquid crystal layer positioned between the substrates. The nematic liquid crystal layer has a positive dielectric anisotropy and a helical axis aligned vertically to the substrates and oriented substantially horizontally with a twist angle from 90 to 270 degrees when no voltage is applied. In the display devices of the invention, a uniaxially oriented film or micropatterned dye-containing film or polarizer or micropolarizer as just described is positioned in the path of viewing the LCD. In some embodiments, the uniaxially oriented material is placed outside of and adjacent to the liquid crystal cell.

The uniaxially oriented films may be positioned on the transparent substrates of the liquid crystal cell as well.

BRIEF DESCRIPTION OF THE DRAWINGS

This invention will be further described with reference being made to the accompanying drawings in which.

DETAILED DESCRIPTION OF THE INVENTION

The Dye

Figure 1:
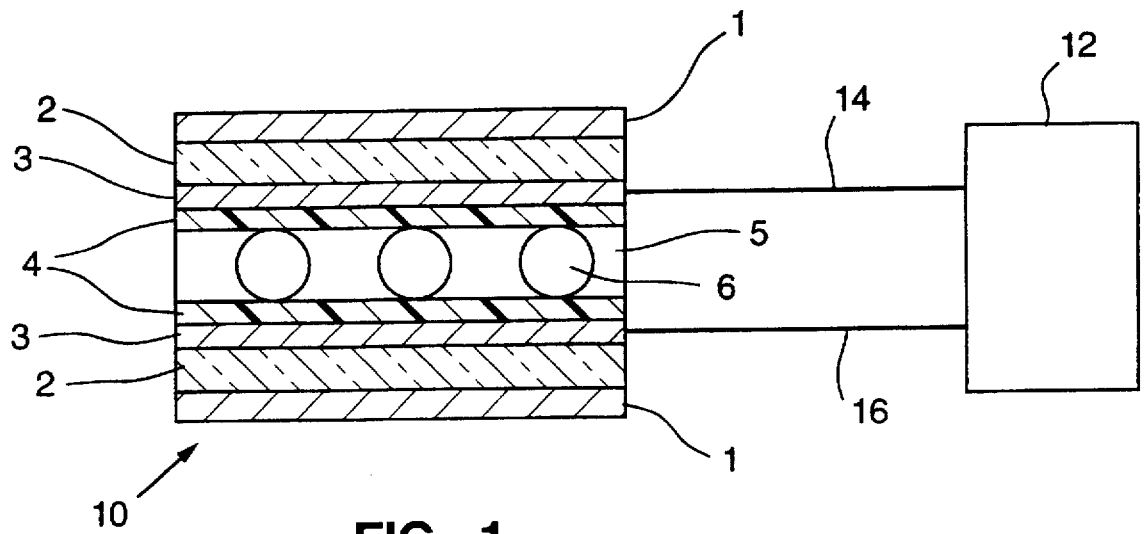
FIG. 1 is a cross-sectional view illustrating a liquid crystal display device and thin film of this invention.

One or more dichroic dyes are present in the films of the present invention. The dye used in the invention may be any dye or pigment meeting the following conditions: It should have an aspect ratio (a length of molecular axis to a length of a molecular perpendicular axis) of not less than 2 and more preferably not less than 3 and it should also have an angle between its molecular axis and a direction of a transition moment from ground state to excited state that is not greater than 20 degrees. Dyes capable of achieving a high dichroic ratio when oriented with a fluororesin alignment layer, as will be described below, are especially preferable. Dyes are preferred which can achieve a dichroic ratio of absorbance (absorbance in the orientation direction to absorbance in a direction perpendicular to the orientation direction) at the wavelength of highest absorption of not less than 5 (preferably not less than 8 and in most cases more preferably not less than 10).

Dichroic dyes used for conventional polarizers or guest-host liquid crystal displays are useful and preferred. Types of dichroic dyes used for guest-host liquid crystal displays and useful herein include merocyanines, styryls, azomethines, azos, anthraquinones, quinones, quinophthalones, perylenes, indigos, tetrazines, stilbenes and benzidines. Azo and anthraquinone dichroic dyes having substantial levels of weather resistance are especially preferred. These azo-dyes include diazos and triazos (polyazos).

Azo dyes useful in the invention include materials depicted by general formula I:

$$Ar—(—N=N—Ar')_n—N=N—Ar \qquad (I).$$

In this formula, n is 0 through 3, each Ar represents an aryl group selected from the structures listed in group A, and each Ar' represents an arylene group selected from the structures listed in Group B below:

Group A

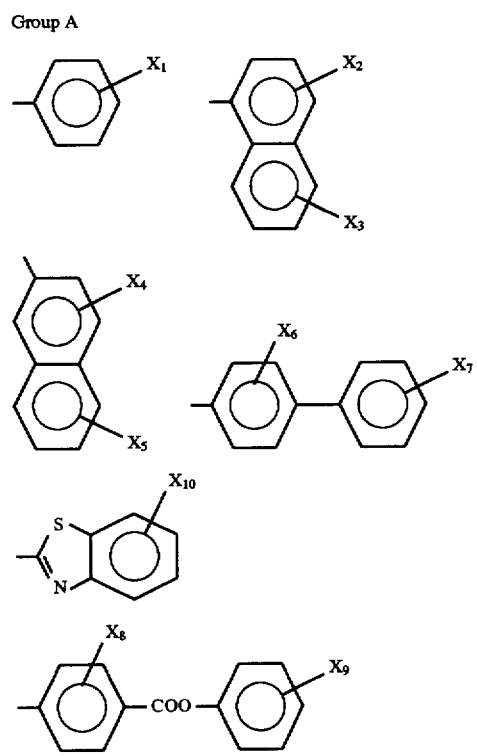

-continued

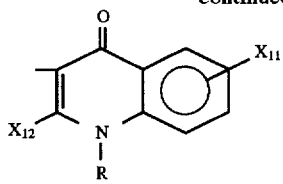

Group B

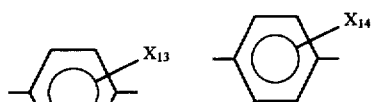

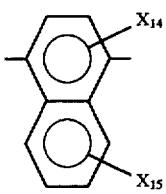

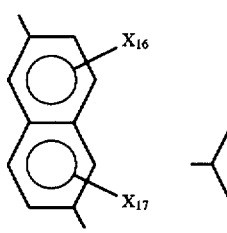

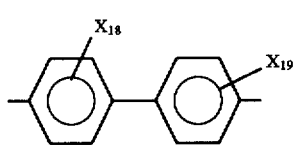

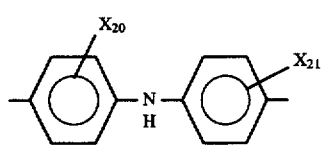

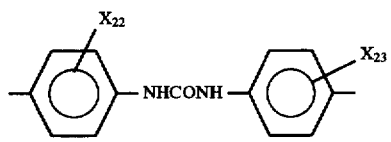

In the above structural formulae, $X_1$ through $X_{23}$ independently represent any of hydrogen atoms, hydroxyl groups, amino groups, arylamino groups, acylamino groups, alkyl groups containing one through four carbon atoms, alkoxy groups containing one through four carbon atoms, aryl groups containing six through twenty carbon atoms, heterocyclic groups containing four through twenty carbon atoms, carboxylate groups, sulfonate groups, sulfonamide groups, sulfonalkylamide groups, halogens, and nitro groups. The number of X groups present on any aromatic ring is equal to the available sites on that ring. For example, in the Group A structure having $X_1$ as a substituent, there would be five such groups, while in the material shown in Group B with $X_{13}$, there would be four such groups, as that is the number of available sites. Two or more different substituent groups may thus be present in one aromatic ring.

R represents any of hydrogen atom, alkyl group containing one through four carbon atoms, aryl group containing six through twenty carbon atoms, heterocyclic group containing four through twenty carbon atoms.

Two aromatic rings on either side of the azo radical may carry hydroxyl groups. These hydroxyl groups are located adjacent to the azo structure and can form a complex with a transition metal atom selected from the group consisting of copper, nickel, zinc and iron.

Azomethines and stilbenes having an azomethine group and a vinylene group respectively in place of the azo radical of the azo dyes defined by general formula I may also be used as the orientable dyes in the practice of this invention.

Representative useful azo dyes include the azo dyes shown in Tables 1-1 and 1-2. These materials can exist as transition metal complexes, as free acids and also as salts, for example, sodium salts, lithium, potassium, ammonium, ethanol ammonium, alkyl ammonium salts and the like.

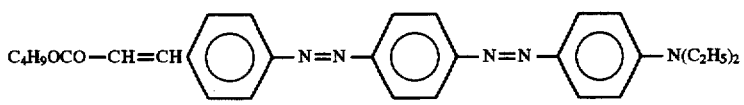

(1)

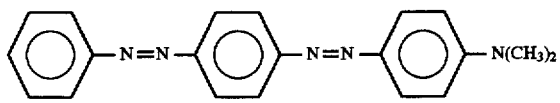

(2)

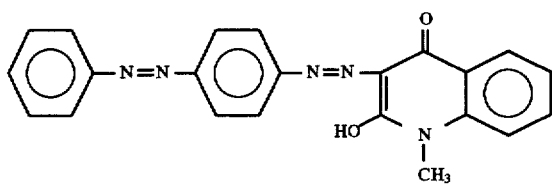

(3)

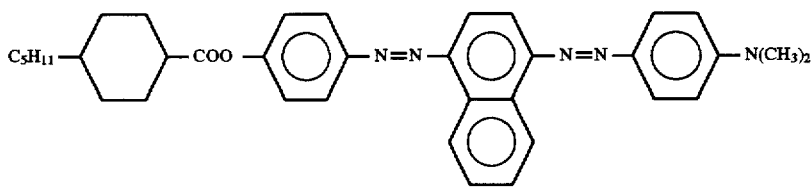

(4)

-continued
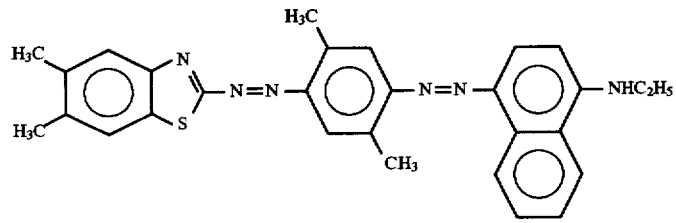
(5)
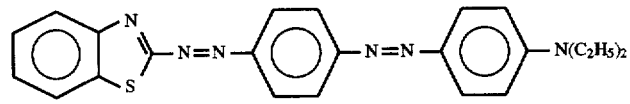
(6)
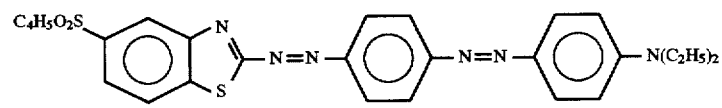
(7)
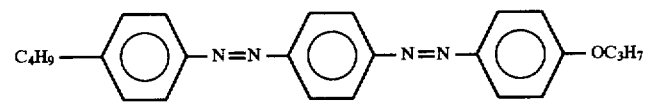
(8)
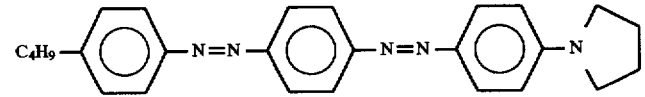
(9)
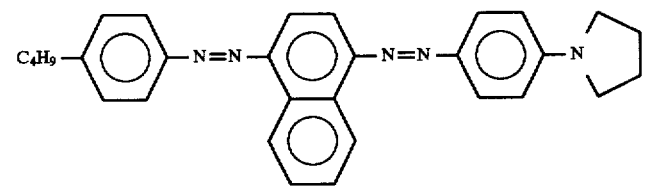
(10)
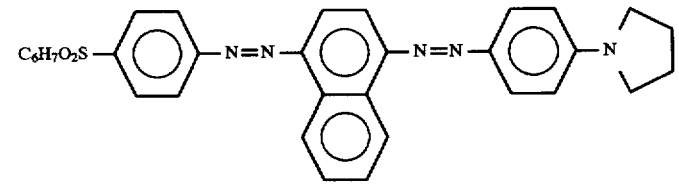
(11)
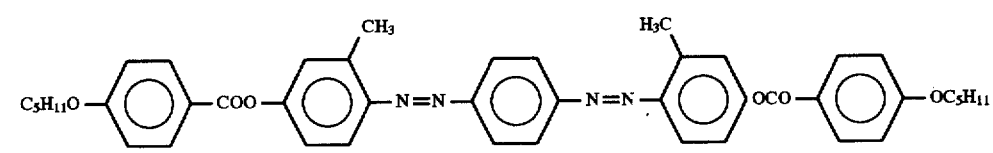
(12)
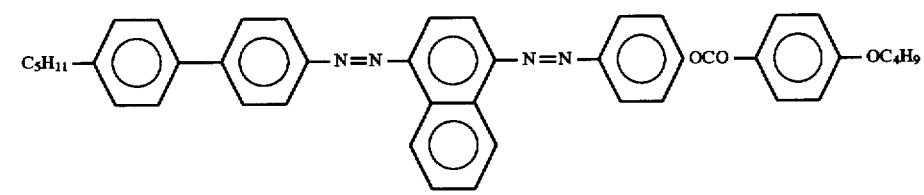
(13)
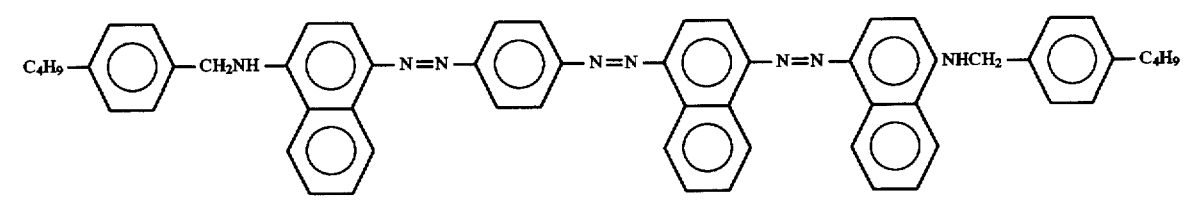
(14)

-continued
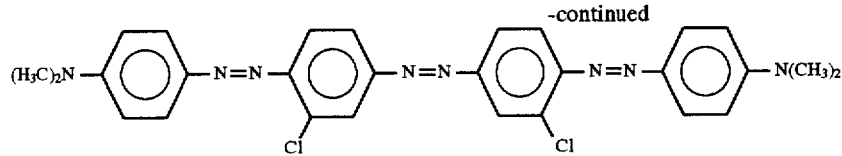 (15)
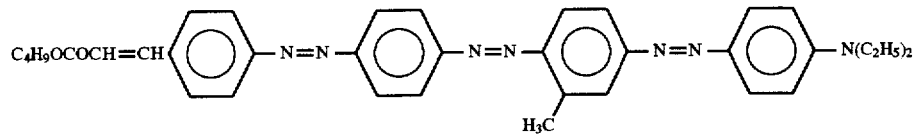 (16)
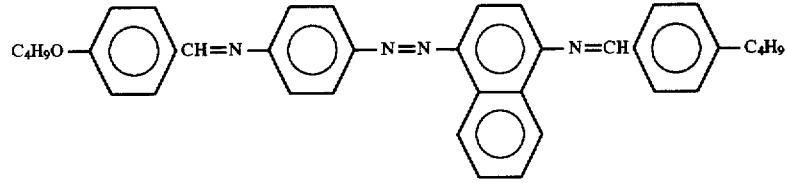 (17)
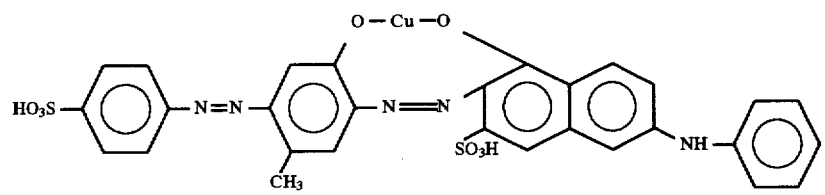 (18)
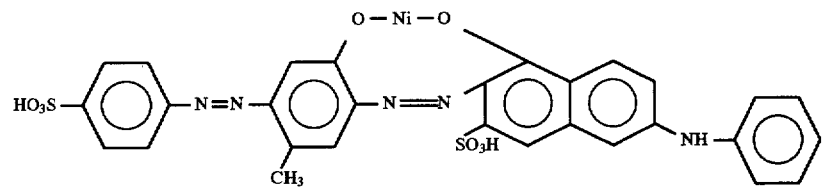 (19)
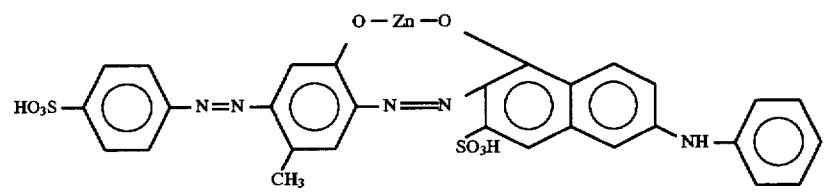 (20)
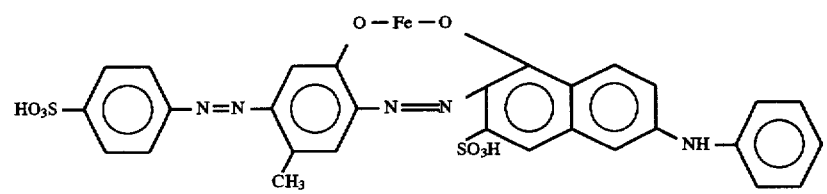 (21)
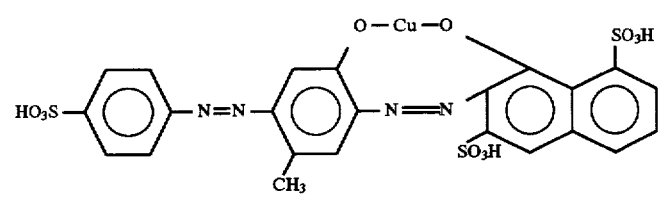 (22)
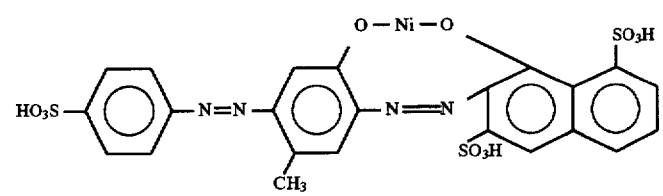 (23)

-continued
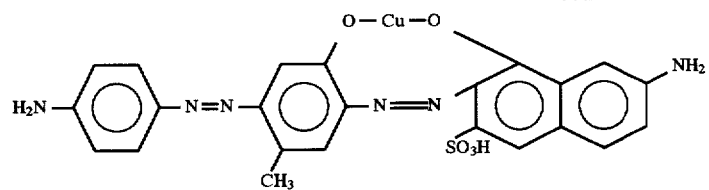  (24)
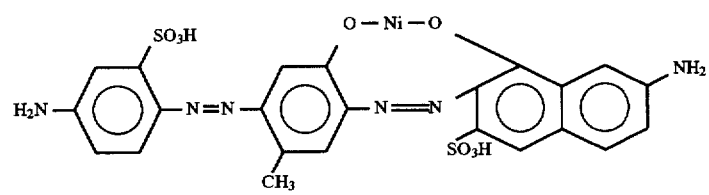  (25)
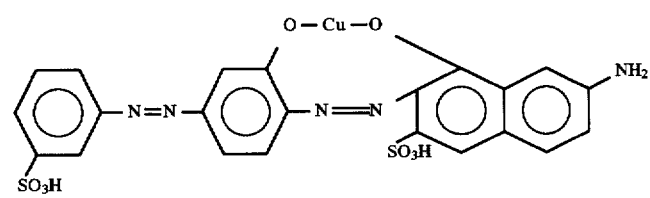  (26)
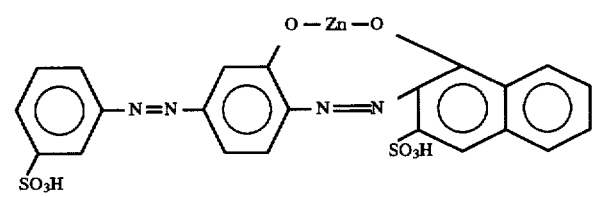  (27)
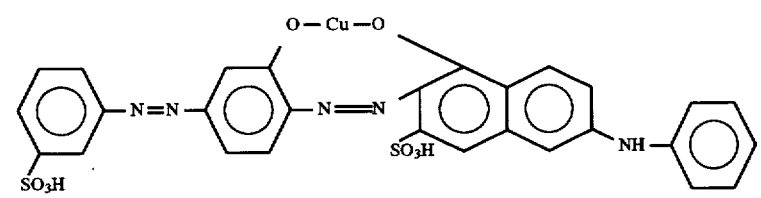  (28)
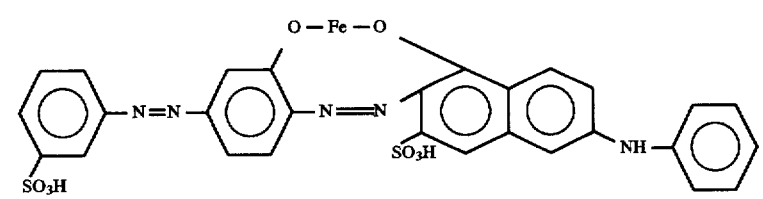  (29)
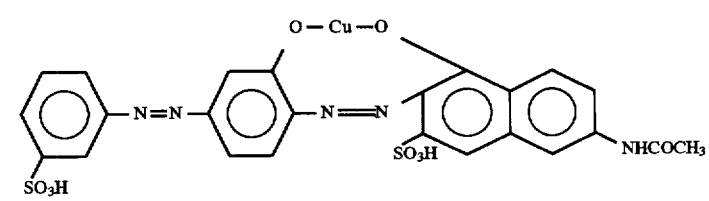  (30)
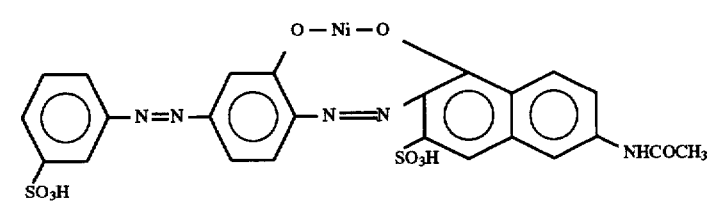  (31)

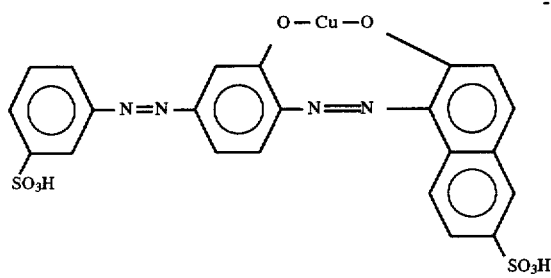
(32)
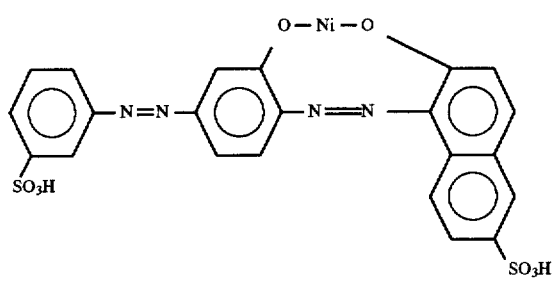
(33)
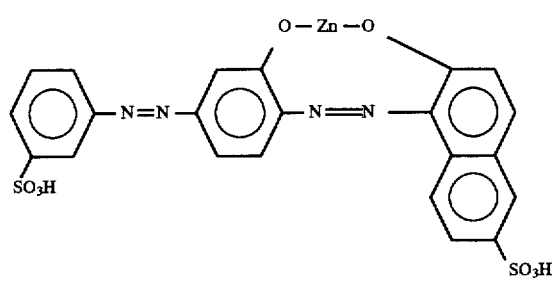
(34)
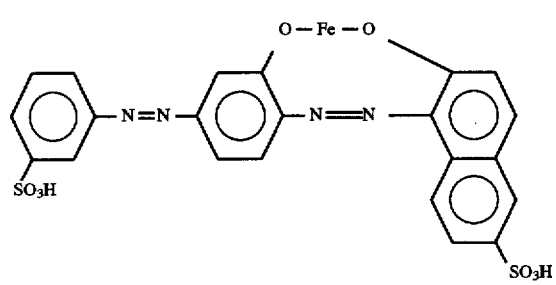
(35)
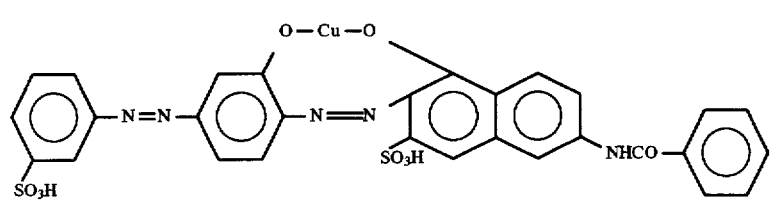
(36)
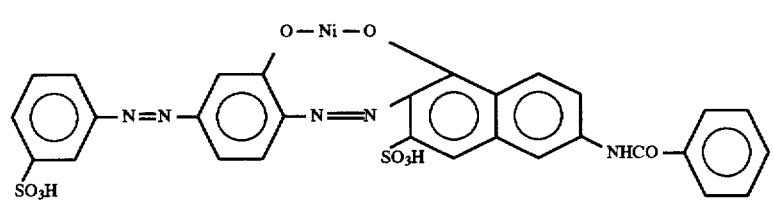
(37)
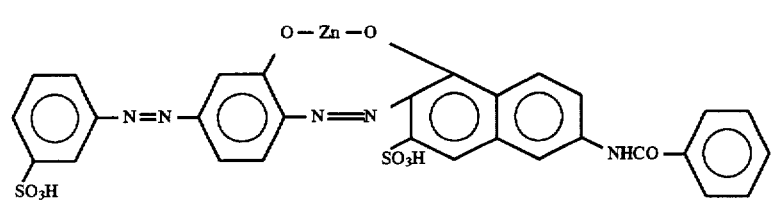
(38)

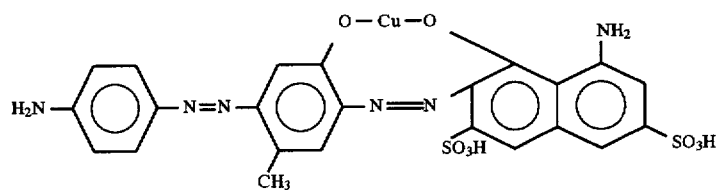
(39)
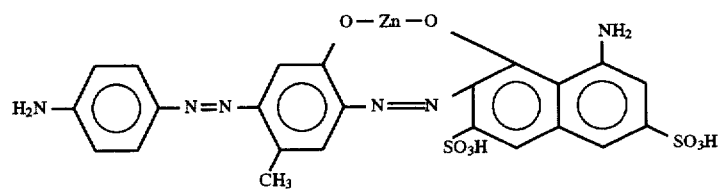
(40)
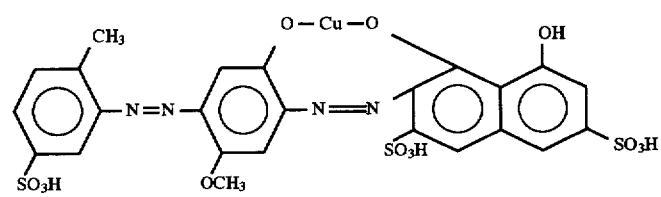
(41)
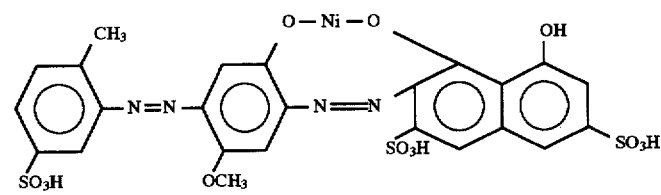
(42)
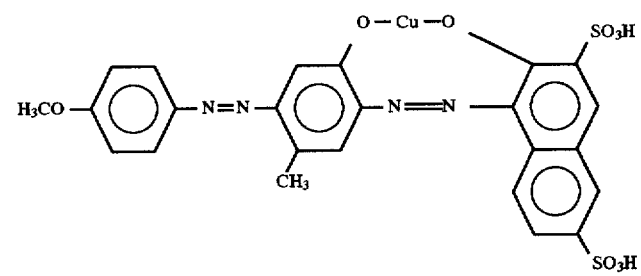
(43)
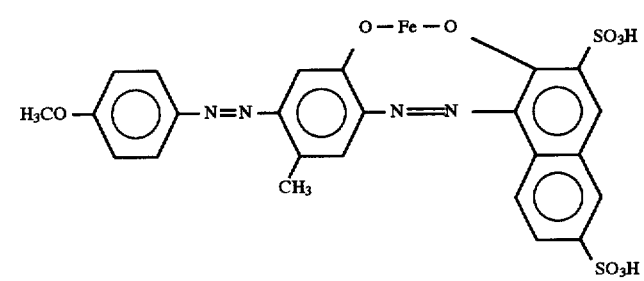
(44)
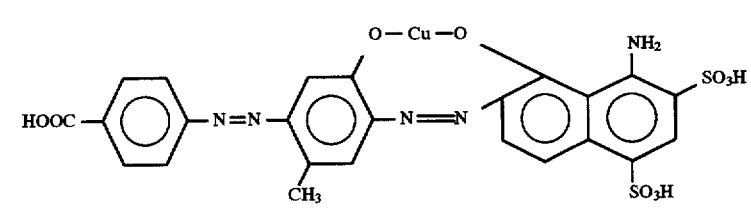
(45)

Other useful azo dyes are those having color index (C.I.) generic names as below:

C.I. Direct Orange 39
C.I. Direct Yellow 44
C.I. Direct Red 28
C.I. Direct Blue 151
C.I. Direct Red 81
C.I. Direct Red 23
C.I. Direct Red 2
C.I. Direct Red 31
C.I. Direct Red 37
C.I. Direct Red 79
C.I. Direct Violet 12
C.I. Direct Violet 9
C.I. Direct Yellow 12
C.I. Direct Blue 78
C.I. Direct Blue 90
C.I. Direct Blue 202
C.I. Direct Yellow 28
C.I. Direct Orange 107
C.I. Direct Blue 71
C.I. Direct Violet 51
C.I. Direct Orange 26
C.I. Direct Red 247
C.I. Direct Blue 168
C.I. Direct Green 85
C.I. Direct Brown 223
C.I. Direct Brown 106

C.I. Direct Yellow 142
C.I. Direct Blue 1

Useful anthraquinone dyes are illustrated by general formula II:

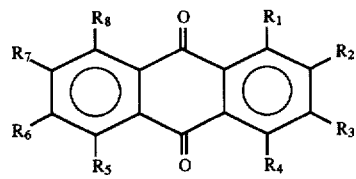

(II)

In this formula $R_1$, $R_2$, $R_3$, $R_4$, $R_5$, $R_6$, $R_7$ and $R_8$ independently represent any of hydrogen atoms, hydroxyl groups, amino croups, arylamino groups, acylamino groups, alkyl groups containing one through four carbon atoms, alkoxy groups containing one through four carbon atoms, aryl groups containing six through twenty carbon atoms, and heterocyclic groups containing four through twenty carbon atoms, provided that all of $R_1$ through $R_6$ are not hydrogen atoms. $R_2$ and $R_3$ or $R_6$ and $R_8$ respectively may be one substituent group which is connected with the anthraquinone group by two linkages.

The anthraquinone dyes useful in the practice of this invention include compounds shown in Tables 2-1, 2-2, 2-3 and 2-4.

Table 2-1

Compounds expressed by general formula II, wherein $R_1$ denotes $NH_2$; $R_5$, $R_6$, $R_7$ and $R_8$ denote H; $R_2$, $R_3$ and $R_4$ denote as shown below.

| | $R_2$ | plus | $R_3$ | $R_4$ |
|---|---|---|---|---|
| 52 | ![structure: C(=O)-N(C3H4OC8H17)-C(=O)] | | | $-NH_2$ |
| 53 | ![structure: C(=O)-N(Ph-C4H9)-C(=O)] | | | $-NH_2$ |
| 54 | ![structure: C(=O)-N(Ph-C4H9)-C(=NH)] | | | $-NH_2$ |
| 55 | ![structure: C(=O)-N(C2H4OC8H17)-C(=S)] | | | $-NH_2$ |
| 56 | ![structure: C(=O)-N(C2H4OC8H17)-C(=S)] | | | $-NH_2$ |
| 57 | ![structure: C(=O)-N(C3H4OC8H17)-C(=NC3H4OC8H17)] | | | $-NH_2$ |
| 58 | $-O-\text{Ph}-C(CH_3)_3$ | | $-O-\text{Ph}-C(CH_3)_3$ | $-NH_2$ |
| 59 | $-OC_9H_{19}$ | | $-H$ | $-OH$ |

-continued
| | R₂ | plus | R₃ | R₄ |
|---|---|---|---|---|
| 60 | 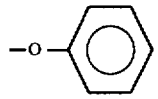 | | —H | —OH |
| 61 | 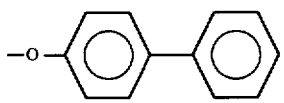 | | —H | —OH |
| 62 | 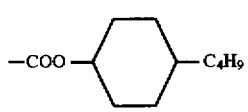 | | —H | 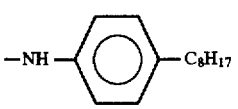 |
Table 2-2
Compounds expressed by general formula II, wherein $R_1$ denotes $NH_2$; $R_4$ and $R_8$ denote OH $R_2$, $R_3$, $R_5$ and $R_7$ denote as shown below.
| | R₂ | R₃ | R₅ | R₇ |
|---|---|---|---|---|
| 63 | 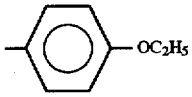 | —H | —NH₂ | —H |
| 64 | 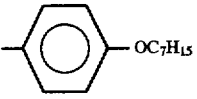 | —H | —NH₂ | —H |
| 65 | 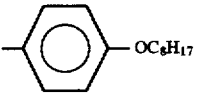 | —H | —NH₂ | —H |
| 66 | 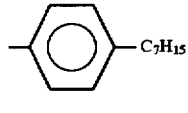 | —H | —NH₂ | —H |
| 67 | —H | 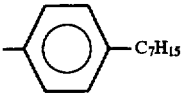 | —NH₂ | —H |
| 68 | —H | 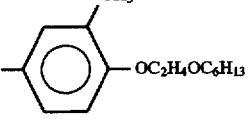 | —NH₂ | —H |
| 69 | —H | 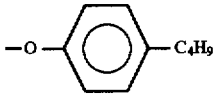 | —H | 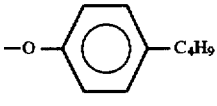 |
| 70 | —H | 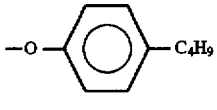 | —OH | 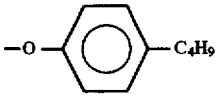 |

Table 2-3

Compounds expressed by general formula II, wherein $R_1$ denotes OH; $R_3$ and $R_7$ denote H; $R_2$, $R_4$, $R_5$, $R_6$ and $R_8$ denote as shown below.

| | $R_2$ | $R_3$ | $R_5$ | $R_7$ |
|---|---|---|---|---|
| 71 | —H | —O—⌬—C₇H₁₅ | —OH | —O—⌬—C₇H₁₅ |
| 72 | —H | —O—⌬—C₄H₉ | —NH₂ | —O—⌬—C₄H₉ |
| 73 | —H | —O—⌬—C₄H₉ | —NH—⌬—C₄H₉ | —O—⌬—C₄H₉ |
| 74 | —H | —O—⌬—C₅H₁₁ | —NH—⌬—C₄H₉ | —O—⌬—C₅H₁₁ |

Table 2-3 (continued)

| | $R_2$ | $R_4$ | $R_5$ | $R_6$ | $R_8$ |
|---|---|---|---|---|---|
| 75 | —O—⌬—C₄H₉ | —H | —OH | —O—⌬—C₄H₉ | —NH—⌬—C₂H₅ |
| 76 | —O—⌬—C₄H₉ | —OH | —OH | —O—⌬—C₄H₉ | —OH |
| 77 | —O—⌬—C₄H₉ | —NHCH₃ | —OH | —O—⌬—C₄H₉ | —NHCH₃ |
| 78 | —H | —NH—⌬—C₄H₉ | —H | —H | —H |

Table 2-4

Compounds expressed by general formula II, wherein $R_2$, $R_3$, $R_4$, $R_6$, $R_7$ and $R_8$ denote H; $R_1$ and $R_5$ denote as shown below.

| | $R_1$ | $R_5$ |
|---|---|---|
| 79 | —NH—⌬—C₂H₅ | —NH—⌬—C₂H₅ |
| 80 | —NH—⌬—N(CH₃)₂ | —NH—⌬—N(CH₃)₂ |
| 81 | —NH—⌬—⌬—C₄H₉ | —NH—⌬—⌬—C₄H₉ |

Quinophthalone dyes useful in the practice of this invention are illustrated by general formula (III):

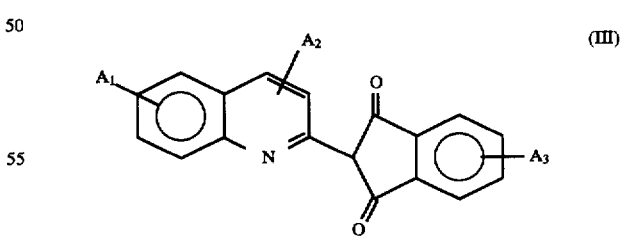

(III)

In general formula III, $A_1$, $A_2$, and $A_3$ independently represent hydrogen atoms, hydroxyl groups, amino groups, arylamino groups, acylamino groups, alkyl groups containing one through four carbon atoms, alkoxy groups containing one through four carbon atoms, aryl groups containing six through twenty carbon atoms, and heterocyclic groups containing four through twenty carbon atoms, provided that all of the $A_1$ through $A_3$ groups are not hydrogen atoms at the same time.

An example of a quinophthalone dye useful in the practice of this invention is:

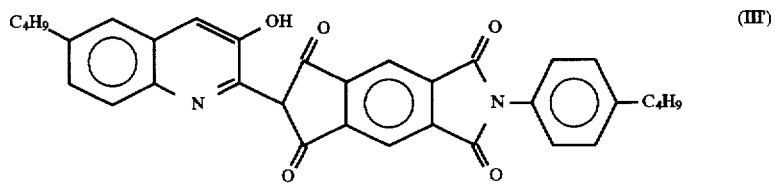

(III)

Perylene dyes useful in the practice of the invention are illustrated by general formula IV:

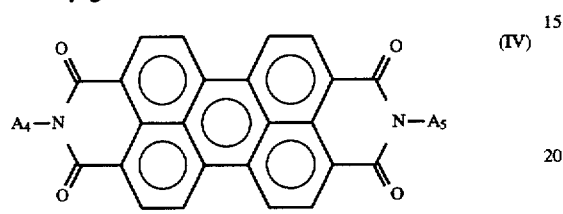

(IV)

In general formula IV, $A_4$ and $A_5$ independently represent hydrogen atoms, hydroxyl groups, amino groups, arylamino groups, acylamino groups, alkyl groups containing one through four carbon atoms, alkoxy groups containing one through four carbon atoms, aryl groups containing six through twenty carbon atoms, and heterocyclic groups containing four through twenty carbon atoms, provided that both of $A_4$ and $A_5$ are not hydrogen atoms at the same time.

An example of a perylene dye preferably used in the practice of this invention is:

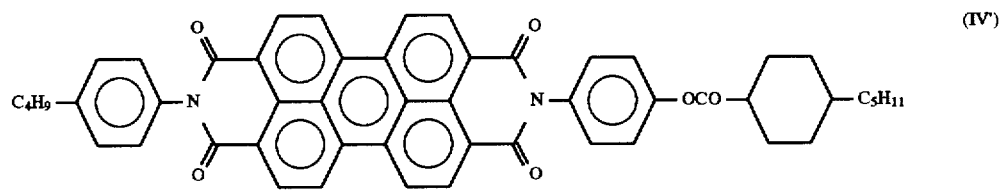

(IV')

Indigo dyes useful in the practice of the invention are illustrated by general formula V:

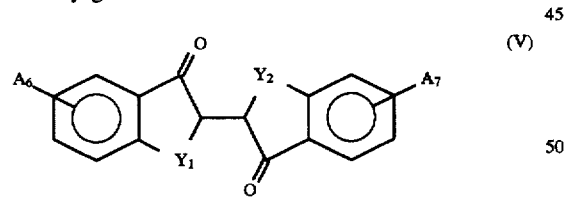

(V)

In general formula V, $Y_1$ and $Y_2$ independently denote NH or S, and $A_6$ and $A_7$ independently represent hydrogen atoms, hydroxyl groups, amino groups, arylamino groups, acylamino groups, alkyl groups containing one through four carbon atoms, alkoxy groups containing one through four carbon atoms, aryl groups containing six through twenty carbon atoms, and heterocyclic groups containing four through twenty carbon atoms, provided that $A_6$ and $A_7$ are not hydrogen atoms at the same time An example of an indigo dye used in this invention is:

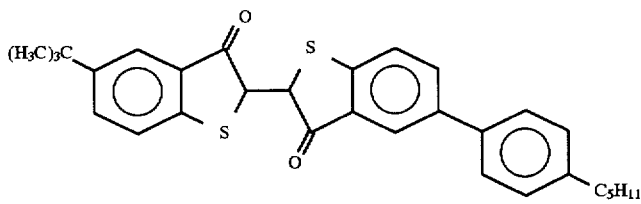

Preferred dyes include Azo dyes 1 through 21 in the tables, C.I. Direct Red 28, C.I. Direct Red 81, anthraquinone dyes 52 through 57 and 68 through 77 in the tables, and dyes expressed by the formulae III', IV', and V'. Especially preferred dyes are azo dyes 1, 4, 6, 7, 8, 9, 10, 12, 13, 14, 15, 16 17, 18, 19, anthraquinone dyes 53, 54, 72, 73, 74, 76, 77, and the dyes expressed by the formulae III', IV' and V'.

Binders or Film-Forming Polymers

The films of the invention can be constituted entirely of the dichroic dye such as is described above. The film can also be made up of mixtures of dye plus one or more binder materials. These binder materials can be diluents or other inert materials but at present in amounts greater than a few percent, should be filming.

When a binder material is mixed with the dye, it should be substantially transparent to visible light and capable of being co-deposited with the dye by the method selected. That is, it should vaporize with the dye, be molten with the dye, or be capable of being dissolved with the dye in the solvent of choice. Polymer compounds are typically used as the binder. Polymer compounds having excellent film-forming ability are preferred as the binder material. Examples of such polymer compounds include poly(vinyl alcohol), poly(ethylene terephthalate), polycarbonate, poly(methyl methacrylate), polyethylene, polypropylene, poly(epsilon-caprc)lactone), and copolymers and derivatives thereof. Especially preferred are poly(vinyl alcohol), polycarbonate, poly(methyl methacrylate), polyethylene, and poly(epsilon-caprolactone).

As noted previously, the films of this invention can be made solely of dye, so the binder is an optional component. If binder is present, however, it is generally not present in amounts greater than 99% by weight, not greater than about 95% by weight and more preferably not greater than about 90% by weight, based on the total film composition.

Properties of the Dye-Containing Film

The thickness of the dye-containing film can be varied as can the dichroic ratio of the dye, the molar absorption coefficient of the dye, and the degree of alignment of the dye in the film. Relatively greater thickness is preferable for preparing a uniform film without pin holes. Relatively thinner films are preferable for high alignment. Excessively thinner films undesirably increase the single-layer transmittance, thus causing decreased polarization properties in the resulting films.

The thickness of the dye-containing layer typically falls between about 1 nanometer and 5 micrometers, especially from 5 nanometers to 1 micrometer and more preferably from 10 nanometers to 0.5 micrometers.

The content of the dye in the dye-containing film can be varied. For best results, the dye content is generally greater than 1 percent by weight. The concentration of dye can range up to 100 percent by weight as some films are formed of neat dye. Preferred concentration ranges are from 5 to 100% by weight and more preferably 10 through 100% by weight. The remainder is binder or the like.

The dye-containing film typically has a peak of absorption at 400 to 800 nm. The dichroic ratio at the wavelength of peak absorption should be not less than 25 and preferably not less than 35. Another characteristic of these films is that their single layer transmittance preferably ranges from 40 to 80 percent.

When the dye-containing film includes a micro-pattern having a minimum width in the film plane of 1 micrometer through 200 micrometer, the preferable dichroic ratio is not less than 10 and more preferably not less than 14. The other conditions are the same as those of the dye-containing film without a micro-pattern.

The Alignment Layer and the Preparation Process

The film containing highly oriented dye of this invention is prepared by applying a layer of a dye or a mixture of a dye and a binder over a fluororesin alignment layer. The alignment layer has a thickness showing favorable orientation properties. The thickness of the alignment layer is 1 nanometer through 2 micrometer, or more specifically 5 nanometer through 1 micrometer and more preferably 10 nanometer through 0.5 micrometer. The fluororesin used in the alignment layer may be any solid fluororesin with PTFE, polytrifluoroethylene, and polyvinylidene fluoride (PVDF) being preferred. PTFE is especially preferred.

In some embodiments of this invention the fluororesin alignment layer is incorporated into the final devices. In this case the fluororesin should be relatively transparent, that is it should have a sufficiently small absorbance in at least a portion of the visible spectrum to allow useful levels of light to pass. If the film is stripped from the alignment layer, this transparency is obviously moot.

The fluororesin alignment layer is prepared by any known method. For example, the method disclosed in U.S. Pat. No. 5,180,470 may be used to provide highly oriented films. That method includes the step of rubbing a fluororesin block against a heated substrate while applying pressure. The heating temperature is varied with the type of resin, but is generally in the range of from about 100° C. to about 350° C. or the decomposition temperature of the resin, if that is lower. Preferred temperatures range between 130° C. and 300° C. The pressure and rubbing speed may be determined by experimentation, but commonly range between 0.01 and 5 MPa and from 0.01 cm/second to 10 cm/second. These conditions assure uniformity and excellent orientation of the alignment layer.

Preparation Methods

The dye-containing film may, in one embodiment, be prepared by vacuum-depositing a suitable orientable dye onto the fluororesin alignment layer. Alternatively, one can apply a molten dye or a dye solution onto the fluororesin alignment layer. In any of these approaches, the dye-containing film may be neat dye or it may be dye plus binder or polymer material.

In the vacuum deposition process, the dye (and possible binder) is heated in a vacuum at a temperature below the dye and/or binder's decomposition point. The dye sublimes and is accumulated on the alignment layer. The dye and binder employed in this case should be selected to not decompose but be capable of being deposited by vacuum and the application of heat such as temperatures in the range of 125° C. to as much as 400° C.

In the process where the dye is deposited as a molten phase, the dye or dye plus binder is melted at a temperature again that should be below the decomposition point for the dye or the binder and applied onto the alignment layer. The dye used in this process should be capable of melting by application of heat and stable in liquid state, again, typically in the 125°–300° range.

In the process of application where a solution of dye is employed, the dye plus solvent is applied onto the alignment layer and the solvent subsequently removed by vaporization. The dye used in this process should have a solubility in the solvent of not less than about 0.1 percent by weight. This dye should be stable in solution and capable in solution and capable of forming a thin, uniform film.

The solvent employed is typically an organic solvent but in the case of neat dyes in some cases may be an aqueous solvent.

Representative organic solvents for use with dyes and dye-binder mixtures should be selected from hydrocarbons, halohydrocarbons, oxyhydrocarbons and the like known in the art as solvents for organic materials and polymers.

Among these three methods, the vacuum depositing method is preferred at this time. At this time, it gives the highest degree of control of the film thickness and the degree of alignment.

In a preferred embodiment, a film having other functions may be laid down on the polarizer film containing oriented dye. This additional film may be a protective overlayer or hard coat such as one made of epoxy resin or a photo-setting resin.

The Substrate

The alignment layer is commonly supported by a substrate. In cases where the aligned dye-containing film is to be used directly, that is, without being removed from the alignment layer and its substrate, the substrate should be transparent to visible light as is the alignment layer and sufficiently smooth on its surface to give a good support to the alignment layer. (As used herein the term "transparent" defines the property of a material of passing a substantial proportion, e.g. at least about 33% of a desired underlength of light impinged upon it.)

Preferred examples of the substrate include glass, poly (ethylene terephthalate), and polycarbonate.

In those cases where the dye-containing film formed on the alignment layer on the forming substrate is stripped off or transferred to another substrate, the forming substrate need not be transparent and metal plates, metal rolls, and metal-coated plates or rolls may be used as the substrate. Metal materials used as a substrate may be stainless steel or nickel plated metals.

The alignment layer and the dye-containing film can be formed directly on such substrates when they have sufficient heat resistance. Glass is an example of a substrate having sufficient heat resistance for direct formation of the alignment layer and dye-containing film. In those situations where the substrate does not have sufficient heat resistance to permit the alignment film to be formed directly upon it, the alignment film and dye-containing film are first formed on a substrate having sufficient heat resistance and then transferred to the other substrate, the subsequent substrate typically being transparent and the like.

Applications of the Dye-Containing Films

The dye-containing films of this invention are employed as polarizers. In such an application, a dye-containing film is typically formed upon a preformed fluororesin alignment film having the required area for the polarizer.

In another preferred application, the film containing the oriented dye can be configured to include a micro-pattern having a width in the film plane of from 1 to 200 micrometers. Such a film is prepared by first patterning an alignment layer in advance or by patterning an alignment layer after it is produced using a mask. This latter method which uses a mask is easily implemented by conventional lithography processes and is thus preferred. This method of patterning is described briefly.

To form a micropolarizer, a fluororesin alignment layer is first formed over a substrate using the methods described above. A photo-resist is then applied on the alignment layer by spin coating or other appropriate process. The photo-resist may be either a negative type or a positive type corresponding to a mask of the desired pattern. The photo-resist is typically applied as a solution. After heat treatment (pre-baking) to remove the solution's solvent, the alignment film with its mask is exposed to light. The light source used is selected to have a wavelength and an intensity suitable for reacting with the photo-resist. The pattern of the photo-resist is developed using conventional photo-resist mask technology. A large enough surface of the alignment area should be free of the photo-resist to permit orienting the dye. A dye-containing film is subsequently formed on the patterned alignment layer using any of the methods described above.

The dye is oriented on those regions of the alignment layer which have been exposed. The dye is not oriented on these areas of the alignment layer which are covered with the photo-resist. In a subsequent step, that portion of the dye deposited upon the photo-resist may be removed together with the photo-resist.

The dye-containing film which results will carry a micro-pattern and forms a fine polarizer having a high degree of resolution and can be used as a color filter having polarizing properties.

The dye-containing film in some cases is employed together with the substrate. In other cases, when the dye-containing film has sufficient strength, it may be stripped off of the substrate. In this case, the dye-containing film formed on the substrate may be mechanically stripped from the substrate or may be released by soaking the film in an appropriate release agent.

The dye-containing film or the micro-patterned dye-containing film prepared in the above manner may be transferred to another substrate for use. When this is done, the dye-containing film should be affixed to the new substrate such as by being strongly pressed against the substrate which has better adhesive properties for the dye film, by the use of heat, or by the use of an adhesive.

Liquid Crystal Display Devices

A primary application of the films of this invention is as part of liquid crystal display devices. The liquid crystal display devices of the present invention are not limited except that the liquid crystal display devices should include a polarizer that itself includes a dye-containing film of this invention or a micropolarizer which contains a micro-patterned dye-containing film of this invention.

Liquid crystal display devices of this invention are prepared by placing an appropriately sized polarizer, including the dye-containing films of this invention outside of a liquid crystal cell or by similarly placing a micropolarizer which includes the micro-patterned dye-containing film of the invention.

In one particular application, the micro-patterned dye-containing film of the invention has a micro-pattern corresponding to pixels, and may be positioned outside the liquid crystal cell or between the liquid crystal layer and one of the substrates of the liquid crystal cell. The micro-patterned dye-containing film of the invention may also be formed on the transparent electrode of the liquid crystal cell and thus employed in the liquid crystal device.

Figure 2:
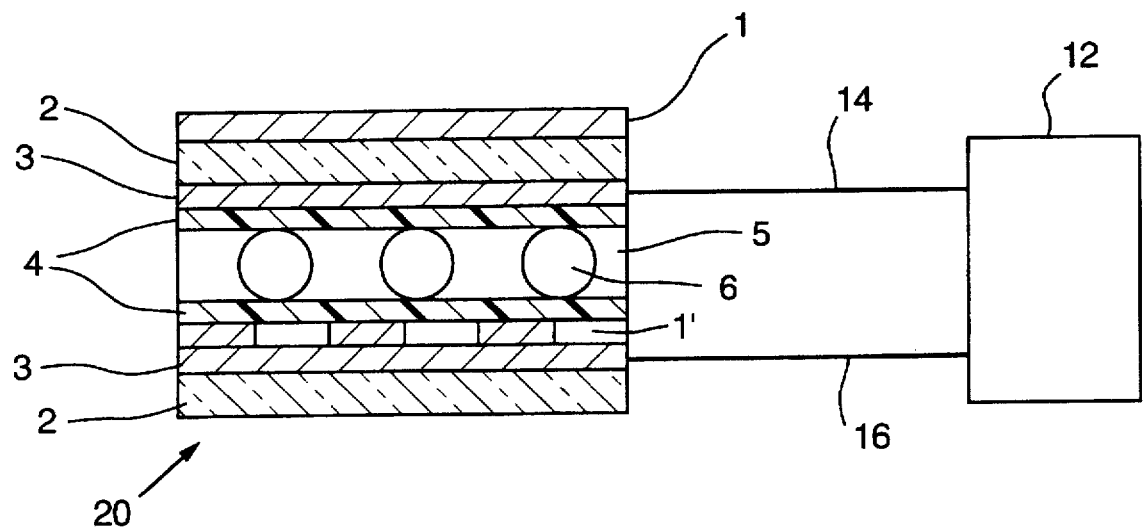
FIG. 2 is a cross-sectional view illustrating another embodiment of a liquid crystal display device and thin film according to the invention.

FIGS. 1 and 2 are not-to-scale cross-sectional views illustrating examples of the liquid crystal display device employing the dye-containing films of the present invention. In FIGS. 1 and 2, liquid crystal display devices 10 and 20 are shown to include a polarizer according to the invention, 1, a micropolarizer according to this invention, 1'; a glass substrate, 2; a transparent electrode, 3; an insulating alignment layer, 4; a liquid crystal layer, 5; and a spacer 6.

In FIG. 2, although the micropolarizer 1' is formed between the transparent electrode 3 and the insulating alignment layer 4, micropolarizer 1' may also be formed below the transparent electrode 3 and the insulating alignment layer 4. The transparent electrode 3 is formed on one face of glass substrate 2 close to the liquid crystal layer 5 and typically includes a transparent conductive material such as ITO (indium tin oxide), $In_2O_3$, or $SnO_2$ or the like. The insulating alignment layer 4 is present between the transparent electrode 3 and the liquid crystal layer 5. The insulating alignment layer 4 may include only an alignment layer having sufficient insulating properties or may include a separate alignment and a separate insulating layer formed below the alignment layer. The alignment layer 4 used here may be any known organic or inorganic, low molecular weight (oligomeric) or high molecular weight polymeric film compounds. Examples of the high molecular weight film compounds include polyimide, polyamide, poly(amide-imide), poly(vinyl alcohol), polystyrene, polyester, poly(ester-imide), and a variety of photo-resists.

The alignment of liquid crystal molecules in layer 5 is further improved by rubbing the polymer alignment layer 4 with gauze or flocked polyacetate fabric.

When a separate insulating layer is present it may be selected from dielectric materials such as titanium oxides, aluminum oxides, zirconium oxides, silicon oxides, and silicon nitrides and the like. The alignment layer and the insulating layer are formed according to any appropriate method. For polymer alignment layers, a polymer compound or a precursor thereof is dissolved in a solvent and applied by screen printing, spin applying, or dip coating. For inorganic alignment layers, an inorganic compound is applied by dip coating, sputter, deposition, or rhombic deposition.

The thickness of the insulating alignment layer 4 is not limited. Typical thicknesses are from 1 nanometer to 2 micrometers, and more preferably from 2 to 100 nanometers.

In the liquid crystal display devices of the invention, a pair of glass substrates 2 each having a transparent electrode 3 and a insulating alignment layer 4 are spaced apart from each other with spacers 6. The spacers 6 may be insulating beads, fibers, or films. Typically, these are composed of silica, alumina, or a polymer and have a predetermined diameter or thickness to provide the desired spacing. After the pair of glass substrates 2 with the spacers 6 therein are sealed, for example, with an epoxy adhesive, a liquid crystal material is poured into the space between the substrates 2.

One or two polarizers 1 consisting of a dye-containing film of the invention are positioned outside the glass substrates 2. In the example shown in FIG. 1, two polarizers 1 are positioned outside the glass substrates 2. In the example of FIG. 2, a micro-polarizer 1' made up of a micro-patterned dye-containing film of the invention is positioned between the transparent electrode 3 and the insulating alignment layer 4 of the liquid crystal cell.

The transparent electrodes are connected to an external driving circuit 12 via lead wires 14 and 16.

As described above, the dye-containing film of the invention is easily manufactured to have an appropriate thickness, a high dichroic ratio, and an excellent single layer transmittance suitable for use as a polarizer. The polarizer or micro-polarizer and the liquid crystal display devics which utilize them have desirable contrast properties.

EXAMPLES

This invention will be further described by the following examples. Since there may be many modifications, alterations, and changes to the specific embodiments set forth in these examples without departing from the spirit and scope of the essential characteristics of this invention, the examples are only illustrative and not to be construed as limiting the scope of this invention.

The dichroic ratio mentioned in these examples is expressed as A1/A2, where A1 represents an absorbance of a polarized light in a direction parallel to an alignment of a dye-containing film and A2 represents an absorbance of polarized light in a direction perpendicular to the alignment of the dye-containing film. The absorbances A1 and A2 are measured at the wavelength of peak absorption, and determined respectively by subtracting a substrate-attributed absorbance from the measured value.

Example 1

(Formation of Alignment Layer)

A PTFE alignment layer was prepared according to the method disclosed in U.S. Pat. No. 5,180,470. A PTFE bar having a diameter of 1.0 cm was pressed against a glass substrate (2.5 cm×8.0 cm) heated at approximately 130° C., under application of a pressure of approximately 0.16 MPa. A PTFE alignment layer having a width of 1.0 cm and a length of 7.0 cm was prepared by moving the substrate at a speed of 0.1 cm/second.

(Formation of Dye-containing Film)

An azo dye G205 (Nihon Kanko Shikiso Co., Ltd.), was vapor deposited on the PTFE alignment layer thus prepared. The vacuum was less than $10^{-5}$ torr and the speed of deposition was 1 nm/second. The thickness of the dye-containing film thus obtained was 53 nm.

(Evaluation of Dichroic Ratio)

Figure 3:
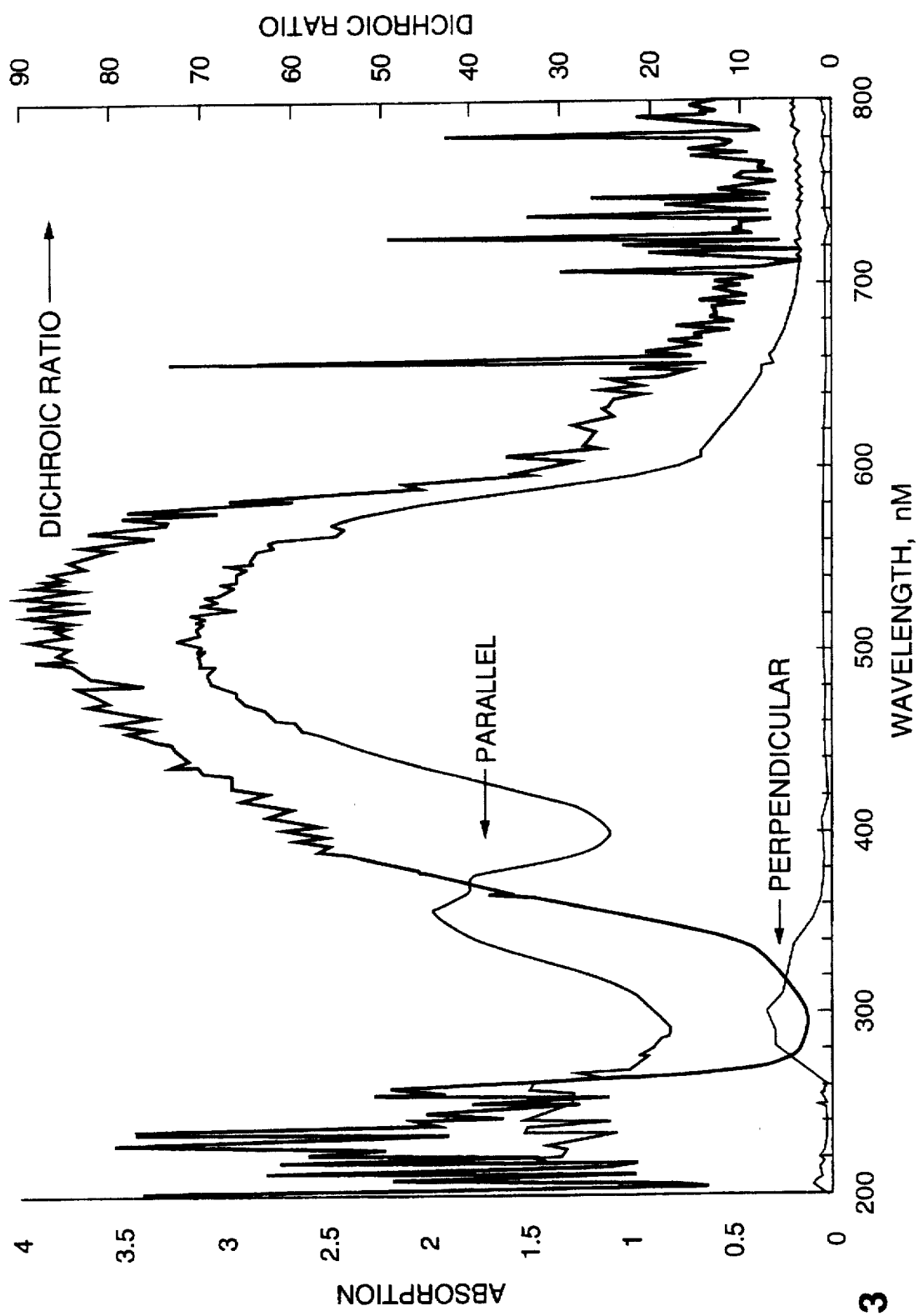
FIG. 3 is a graph illustrating the optical absorbance of a film of this invention over the visible spectrum.

The absorbance of the G205 film obtained was measured in the range of 300 through 700 nm of polarized light. The dichroic ratio at the absorption peak was 86 as shown in FIG. 3.

The dye-containing films prepared as above are placed at an orientation of 90 degree-twisting on both sides of a twist nematic (TN) liquid crystal cell. The TN liquid crystal cell has a variation in non-color and red, thus showing a favorable contrast when the cell is driven.

Example 2

(Formation of Dye-containing Film)

An azo dye G232 (Nihon Kanko Shikiso Co., Ltd.) was deposited on a PTFE alignment layer prepared in the same manner as described in Example 1. The vacuum was less than $10^{-5}$ torr and the speed of deposition was 1 nm/second. The thickness of the dye-containing film thus obtained was 164 nm.

(Evaluation of Dichroic Ratio)

Figure 4:
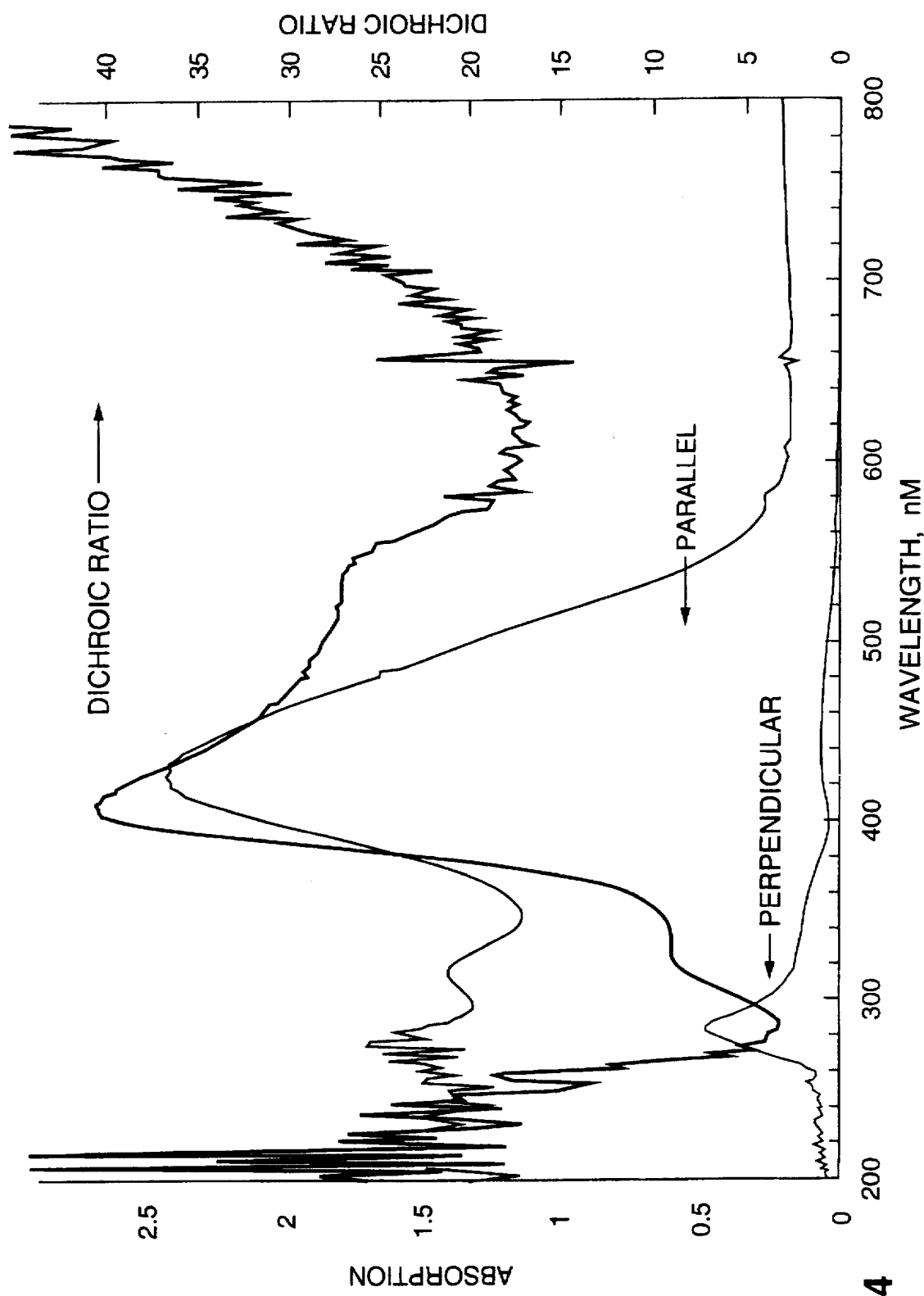
FIG. 4 is a graph illustrating the optical absorbance of a film of this invention over the visible spectrum.

The absorbance of the G232 film obtained was measured in the range of 300 through 700 nm of polarized light. The dichroic ratio at the absorption peak was 40 as shown in FIG. 4.

The dye-containing films prepared as above are placed at an orientation of 90 degree-twisting on both sides of a TN liquid crystal cell. The TN liquid crystal cell has a variation in non-color and yellow, thus showing a favorable contrast when the cell is driven.

Example 3

(Formation of Micro-patterned Dye-containing Film)

A positive photo-resist MICROPOSIT® Photo-resist (Shiplay Far East Ltd.) was spin-coated at 4000 rpm on a PTFE alignment layer prepared in the same manner as Example 1, and heat-treated (pre-baked) at 90° C. for thirty minutes. The thickness of the photo-resist was 1.2 micrometer. The alignment layer with a mask was then exposed to light emitted from an ultraviolet light source (436 nm and 405 nm, 50 mJ/cm$^2$). The alignment layer was then washed with a developing agent MICROPOSIT® Developer (Shiplay Far East Ltd.) for removal of the photo-resist on the exposed portion. The minimum width of the photo-resist and the minimum width of the exposed alignment layer were 3 micrometer and 5 micrometer, respectively.

An azo dye G205 (Nihon Kanko Shikiso Co., Ltd.) was deposited on the micro-patterned alignment layer thus prepared. The degree of vacuum was less than $10^{-5}$ torr and the speed of deposition was 1 nm/second. The thickness of the dye-containing film thus obtained was 45 nm.

(Evaluation of Dichroic Ratio)

Figure 5:
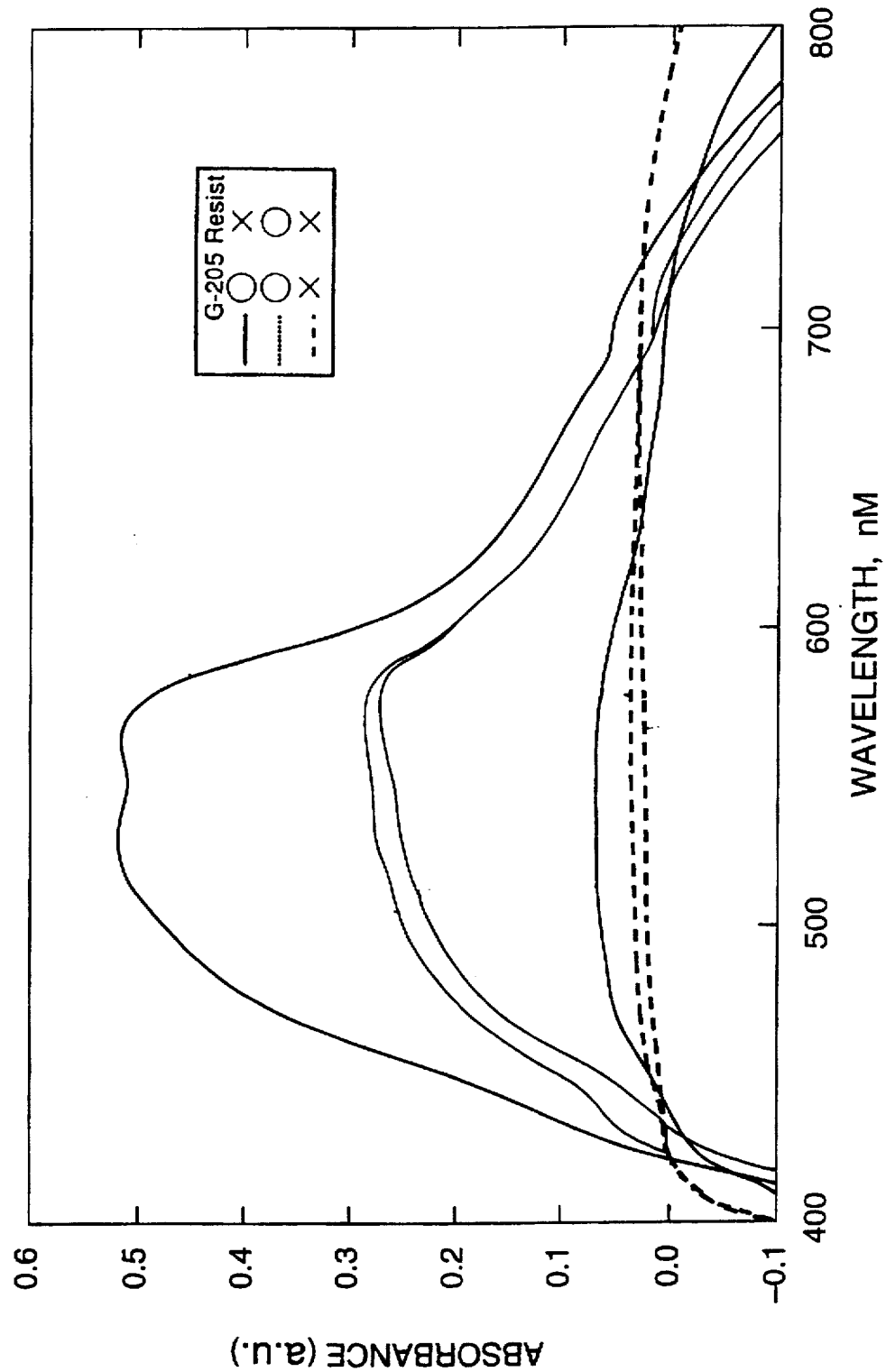
FIG. 5 is a graph illustrating the optical absorbance of a film of this invention over the visible spectrum.

The absorbance of the G205 film obtained was measured in the range of 300 through 700 nm of polarized light. The dichroic ratio at the absorption peak was 14. The absorbance was measured with and without the patterned photoresist with the results being as shown in FIG. 5.

The micro-patterned dye-containing film prepared as above is placed between an electrode and an insulating alignment layer of a TN liquid crystal cell while the dye-containing film of Example 1 is placed at an orientation of 90 degree-twisting on one side of the TN liquid crystal cell. The TN liquid crystal cell has a variation in non-color and red, thus showing a favorable contrast when the cell is driven.

The liquid crystal display device shown in FIG. 1 or FIG. 2 is prepared by combining a polarizer consisting of a dye-containing film or a micro-polarizer consisting of a micro-patterned dye-containing film with a liquid crystal cell containing a pair of transparent substrates having electrodes thereon and a nematic liquid crystal layer positioned between the substrates. The crystal layer contains a nematic liquid crystal having a positive dielectric anisotropy and its helical axis aligned vertically to the substrate. The crystal layer is oriented substantially horizontally in the twist angle range of not less than 90 degrees and not greater than 270 degrees when no voltage is applied. The liquid crystal display device thus prepared has excellent display properties including a favorable contrast.

As described above, the dye-containing film of the invention including a fluororesin as an alignment film is easily manufactured to have an appropriate thickness, a high dichroic ratio, and an excellent single layer transmittance suitable for a polarizer. The polarizer or micro-polarizer and the liquid crystal display device utilizing the dye-containing film have preferable contrast properties.

What is claimed is:

1. A uniaxially oriented film of a film-forming material comprising at least 1% by weight dichroic dye, said dye having a wavelength of peak absorbance of from 400 to 800 nanometers, the film having a thickness of from 1 nanometer to 5 micrometers, having a dichroic ratio of not less than 25 at the wavelength of peak absorbance and having been formed by deposit of the film-forming material upon a fluororesin alignment layer.

2. The uniaxially oriented film of claim 1 consisting essentially of dichroic dye.

3. The uniaxially oriented film of claim 1 comprising an admixture of binder polymer and at least 1% by weight dichroic dye.

4. The uniaxially oriented film of claim 1 wherein the dye has an aspect ratio of not less than 2.

5. The film of claim 1 wherein the fluroresin is PTFE polytetrafluorethylene.

6. A polarizer comprising a transparent support having a planar surface carrying a uniaxially oriented film of claim 1.

7. The polarizer of claim 6 wherein the support is a polymer film.

8. The polarizer of claim 6 wherein the support is a glass plate.

9. The polarizer of claim 6 wherein the support is a transparent electrode.

10. A liquid crystal display device comprising
a liquid crystal cell containing a pair of separated transparent substrates having electrodes thereon and a nematic liquid crystal layer positioned between the substrates, the nematic liquid crystal layer having a positive dielectric anisotropy and a helical axis aligned vertically to the substrates and oriented substantially horizontally with a twist angle of from 90 to 270 degrees when no voltage is applied and
a polarizer of claim 6 positioned adjacent to a transparent electrode of the liquid crystal cell.

11. The display device of claim 10 wherein the polarizer is outside the cell.

12. The display device of claim 10 wherein the polarizer is inside the cell between the liquid crystal layer and a transparent electrode.

13. A body of micro-patterned dye-containing film of a film-forming material comprising at least 1% by weight uniaxially oriented dichroic dye, said dye having a wavelength of peak absorbance of from 400 to 800 nanometers, the film having a thickness of from 1 nanometer to 5 micrometers, having a dichroic ratio of not less than 10 at the wavelength of peak absorbance, a micropattern width of from 1 to 200 micrometers and having been formed by deposit of the film-forming material upon a micropatterned fluororesin alignment layer.

14. The body of micro-patterned dye-containing film of claim 13 consisting essentially of dichroic dye.

15. The body of micro-patterned dye-containing film of claim 13 comprising an admixture of binder polymer and at least 1% by weight dichroic dye.

16. The body of micro-patterned dye-containing film of claim 13 wherein the dye has an aspect ratio of not less than 2.

17. A micropolarizer comprising a transparent support having a planar surface carrying a body of micro-patterned dye-containing uniaxially oriented film of claim 13.

18. The micropolarizer of claim 17 wherein the support is a polymer film.

19. The micropolarizer of claim 17 wherein the support is a glass plate.

20. The micropolarizer of claim 17 wherein the support is a transparent electrode.

21. A liquid crystal display device comprising
   a liquid crystal cell containing a pair of separated transparent substrates having electrodes thereon and a nematic liquid crystal layer positioned between the substrates, the nematic liquid crystal layer having a positive dielectric anisotropy and a helical axis aligned vertically to the substrates and oriented substantially horizontally with a twist angle of from 90 to 270 degrees when no voltage is applied and
   a micropolarizer of claim 17 positioned adjacent to a transparent electrode of the liquid crystal cell.

22. The display device of claim 21 wherein the polarizer is outside the cell.

23. The display device of claim 21 wherein the polarizer is inside the cell between the liquid crystal layer and a transparent electrode.

24. A uniaxially oriented film comprising at least 1% by weight dichroic dye and having a thickness of from 1 nanometer to 5 micrometers, a wavelength of peak absorbance of from 400 to 800 nanometers, and a dichroic ratio of not less than 25 at the wavelength of peak absorbance formed on and present upon a fluororesin alignment layer.

25. A body of micro-patterned dye-containing film comprising at least 1% by weight uniaxially oriented dichroic dye and having a thickness of from 1 nanometer to 5 micrometers, a wavelength of peak absorbance of from 400 to 800 nanometers, and a dichroic ratio of not less than 10 at the wavelength of peak absorbance, said micropattern having a length and width in the film plane with the width being from 1 to 200 micrometers on a fluororesin alignment layer.

26. A method for manufacturing a uniaxially-oriented, light polarizing film, the method comprising the steps of
   a) obtaining a solid fluororesin alignment layer having a thickness of from about 1 nanometer through about 2 micrometers, and
   b) forming a film from a film-forming material comprising at least 1% by weight dichroic dye and having a thickness of from 1 nanometer to 5 micrometers, a wavelength of peak absorbance of from 400 to 800 nanometers on said fluororesin alignment layer, thereby yielding a uniaxially oriented film having a dichroic ratio of not less than 25 at the wavelength of peak absorbance.

27. The method of claim 26 wherein the film-forming material additionally comprises a film-forming polymer.

28. The method of claim 26 comprising the additional steps of
   c) stripping the film from the alignment layer and
   d) applying the film to a supporting substrate.

29. A method for manufacturing a body of micro-patterned dye-containing film comprising
   a) obtaining a solid fluororesin alignment layer having a thickness of from about 1 nanometer through about 2 micrometers and a defined width in the film plane of from 1 to 200 micrometers, and
   b) forming a film of a film-forming material comprising at least 1% by weight uniaxially oriented dichroic dye and having a thickness of from 1 nanometer to 5 micrometers, a wavelength of peak absorbance of from 400 to 800 nanometers on said fluororesin alignment layer thereby yielding a body of uniaxially oriented film having a defined width of from 1 to 200 micrometers and a dichroic ratio of not less than 10 at the wavelength of peak absorbance.

30. The method of claim 29 comprising the additional steps of
   c) stripping the film from the alignment layer and
   d) applying the film to a supporting substrate.

* * * * *